Dec. 13, 1938.   J. LEDWINKA   2,140,476
COMBINED BODY AND CHASSIS UNDERFRAME
Filed Aug. 8, 1935   4 Sheets-Sheet 1
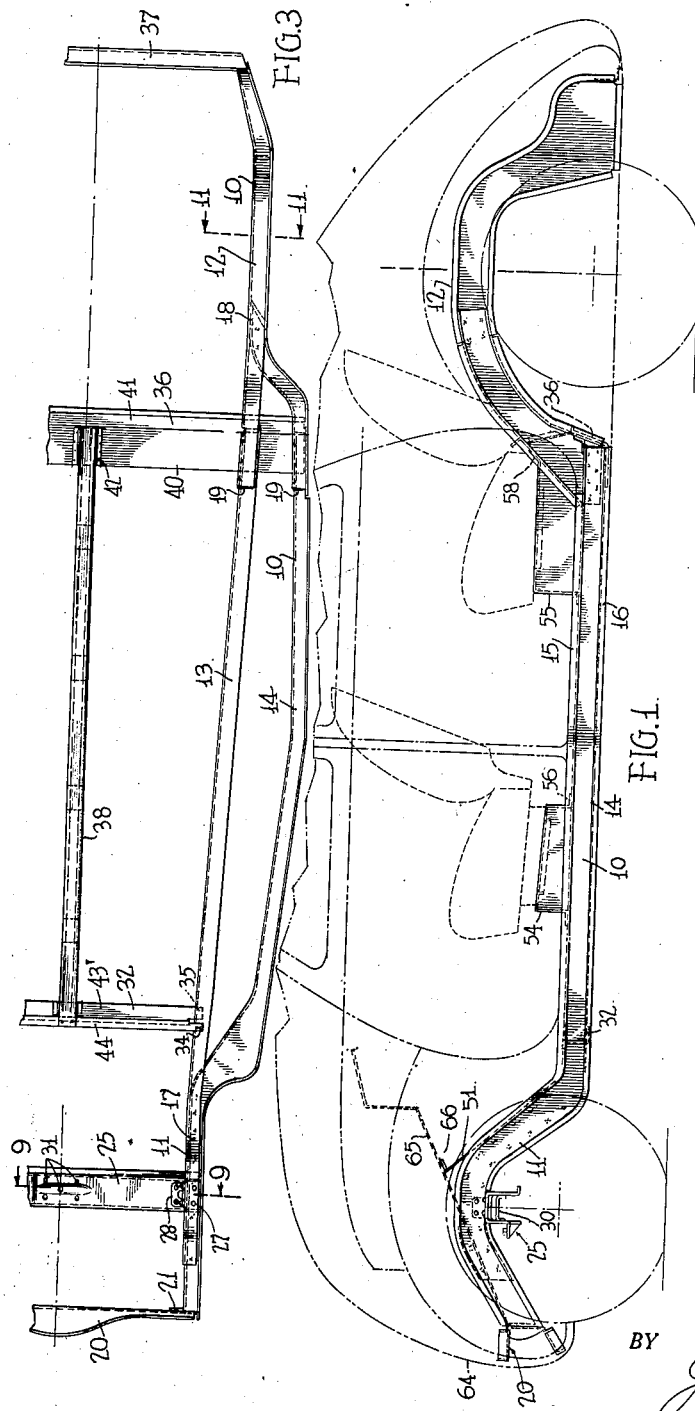
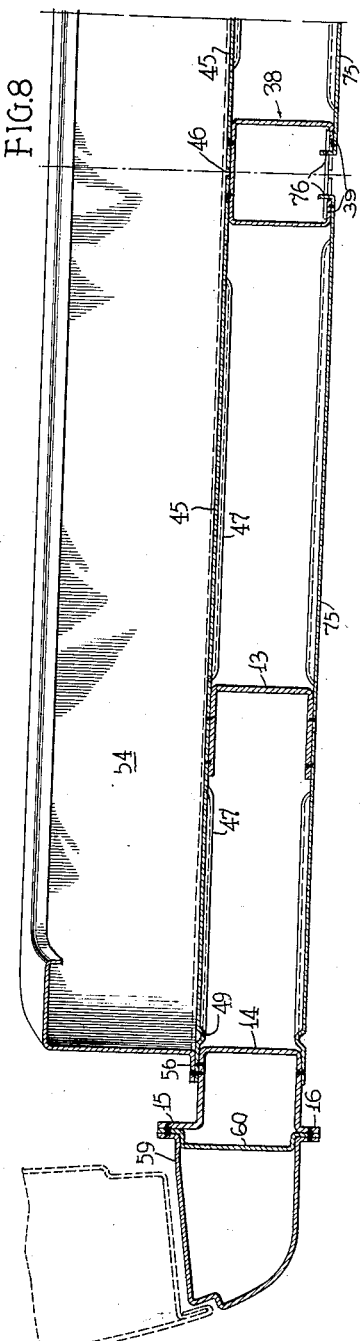
INVENTOR.
JOSEPH LEDWINKA
BY
John P. Barbour
ATTORNEY.

Dec. 13, 1938.　　　　J. LEDWINKA　　　　2,140,476
COMBINED BODY AND CHASSIS UNDERFRAME
Filed Aug. 8, 1935　　　　4 Sheets-Sheet 2

INVENTOR.
JOSEPH LEDWINKA.
BY
John P. Barbox
ATTORNEY.

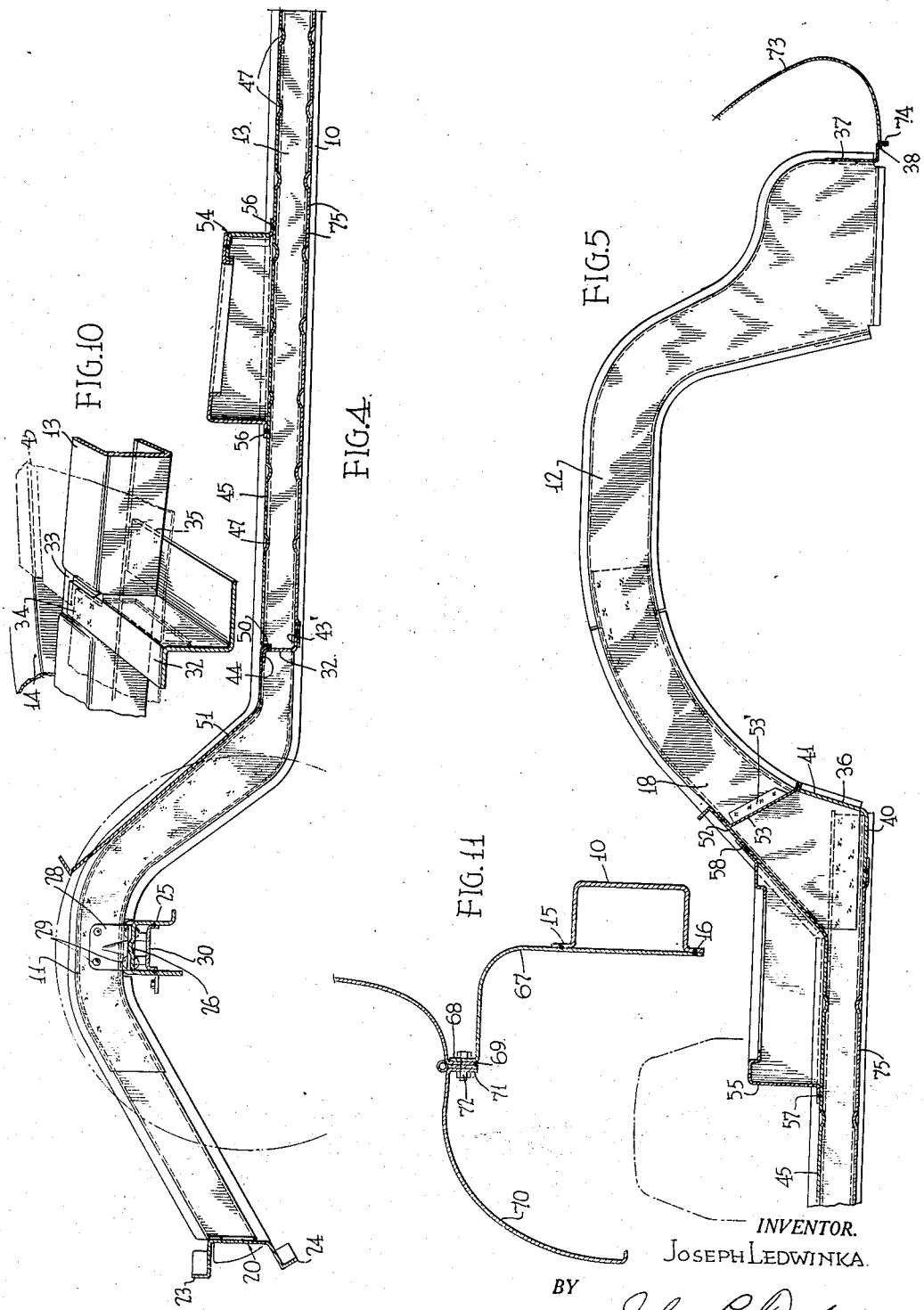

Dec. 13, 1938.  J. LEDWINKA  2,140,476
COMBINED BODY AND CHASSIS UNDERFRAME
Filed Aug. 8, 1935  4 Sheets-Sheet 4
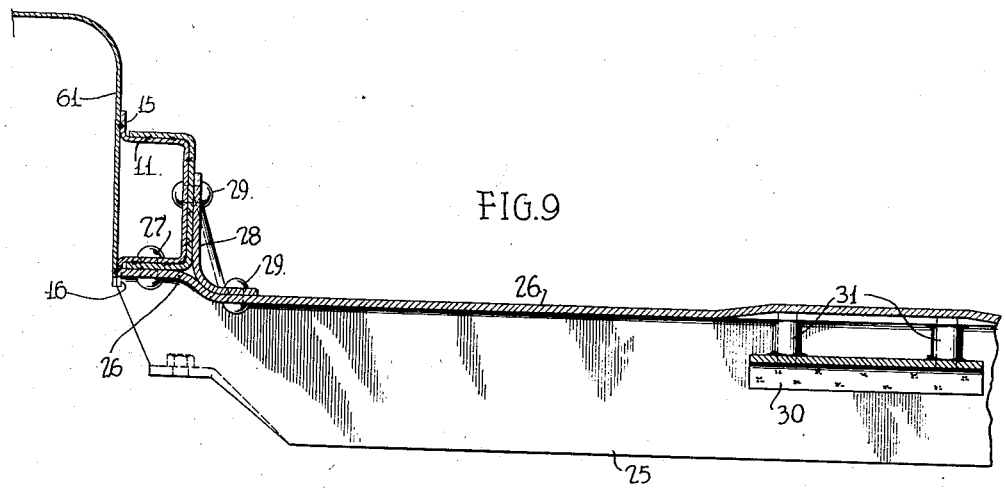
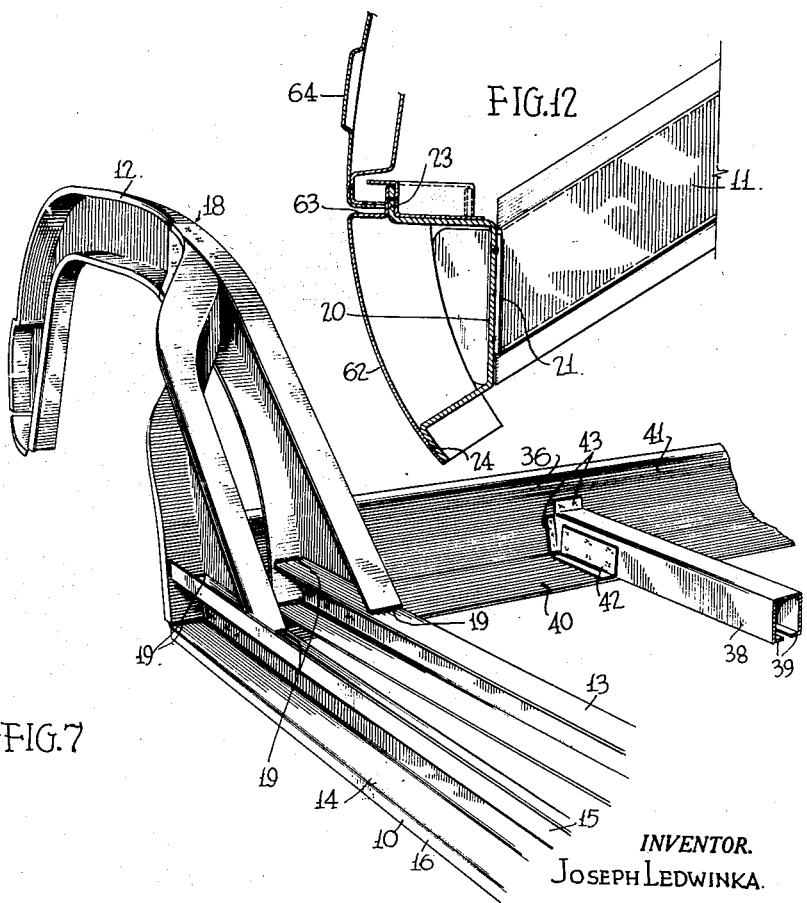
INVENTOR.
JOSEPH LEDWINKA.
BY
ATTORNEY.

Patented Dec. 13, 1938

2,140,476

UNITED STATES PATENT OFFICE 2,140,476

COMBINED BODY AND CHASSIS UNDER-FRAME

Joseph Ledwinka, Philadelphia, Pa., assignor to Edward G. Budd Manufacturing Company, Philadelphia, Pa., a corporation of Pennsylvania Application August 8, 1935, Serial No. 35,928

21 Claims. (Cl. 296—28)

The invention relates to a combined body and chassis underframe for automobile vehicles and has for its principal object the overall reduction in weight of such structures.

To this end the sills, flooring and seat structures are combined in the finished structure so as to structurally reinforce each other and provide a rigid frame construction even with the use of light gauge sheet metal structural members. The invention has for a further object the provision of such a structure which is very low hung, bringing the thresholds of the doors so low as to make easy entry thereinto without the use of running-boards.

Another object is the formation of the members entering into the structure in large part of flanged channel form to permit ready joinder of the parts to each other by simple spot welding operations and the easy final assembly of the body superstructure with the underframe in the final assembly.

These and further objects and advantages will become apparent from the following detailed description when read in connection with the accompanying drawings forming a part hereof.

In the drawings,

Fig. 1 is a side elevational view of the underframe construction according to the invention showing the lower portion of the body applied thereto in dot and dash line outline, the top portion of the body being broken away.

Fig. 3 is a plan view similar to Fig. 2 of the main frame members of the underframe.

Fig. 4 is an enlarged central longitudinal sectional view through the front portion of the underframe.

Fig. 5 is a similar enlarged view through the rear portion of the underframe showing a fragmentary portion of the rear wall of the body and its relation to the underframe.

Fig. 7 is a similar enlarged view of the right hand rear portion of the underframe with the rear cross member omitted.

Fig. 8 is an enlarged transverse vertical sectional view along the line 8—8 of Fig. 2 and looking in the direction of the arrows, this view showing the threshold portion of the body superstructure in its assembled relation to the underframe.

Fig. 9 is an enlarged fragmentary sectional view taken substantially on the line 9—9 of Fig. 3 and looking in the direction of the arrows and showing the front wheel housing portion of the body superstructure in assembled relation to the underframe.

Fig. 10 is an enlarged fragmentary view in perspective of the joint within the circle 10 of Fig. 6.

Fig. 11 is a detail sectional view indicated by the line 11—11 of Fig. 3 looking in the direction of the arrows and showing the rear wheel housing and fender of the body side wall in assembled relation to the underframe.

Fig. 12 is a fragmentary longitudinal central section taken along the line 12—12 of Fig. 2 looking in the direction of the arrows and showing the front wall of the body in assembled relation to the underframe.

Figure 2:
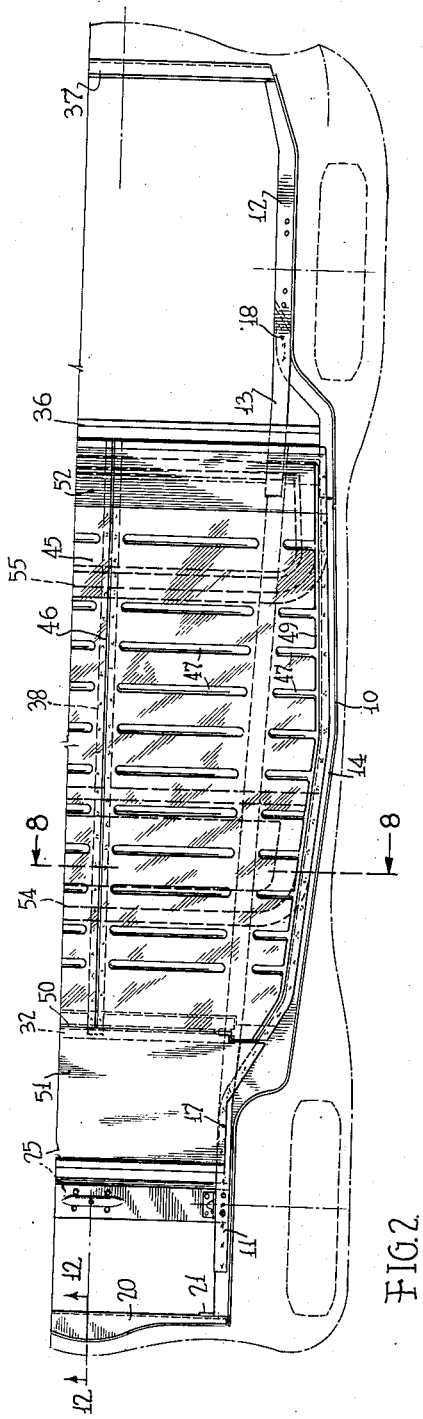
Fig. 2 is a plan view of the left hand side of the underframe shown in Fig. 1 with the body and wheels shown in outline and the seat risers merely indicated in dotted lines.

In accordance with the form of the invention shown in the drawings, the underframe is constructed throughout of light gauge stampings for the most part of angle or channel cross section and joined together in many cases to form box sectioned structures. The flooring sheet and the seat risers are utilized in this way to form box section reinforcements for the underframe.

The intermediate portion of the underframe, as will readily appear from Fig. 1 of the drawings, is arranged substantially at the level of the wheel axles or slightly therebelow, the main members of the underframe comprising the side sills 10 extending from end to end of the chassis, the end portions 11 and 12, respectively, extending over the front and rear wheel axles and being upwardly bowed in substantially the form of an inverted U as seen in side elevation, the extreme front and rear end of the sills being substantially in the same plane as the intermediate portion between the axles. Throughout the greater portion of their length in the region between the wheel axles, the side sills each comprise an inner substantially rectilinear member 13 and an outer outwardly bowed member 14 conforming in its outer portion to the lower side edges of the body to be mounted thereon. In the regions of the front and rear upwardly bowed or kick-up portions 11 and 12 of the sills, the inner member 13 and the outer member 14 converge and are merged into one single member extending to the end of the chassis from the point of merger, the sills in these end regions extending substantially parallel to the wheel planes.

To add strength to the sill members and to facilitate their merger and joinder together in the regions of the kick-up portions at front and rear, and to facilitate the assembly of the parts, both the outer and inner members 13 and 14 of the intermediate portions of the sills and the merged end extensions 11 and 12 are formed as outwardly facing channels. In their outer margins these outwardly facing channels are flanged at top and bottom as indicated at 15 and 16, Figs. 1 and 8, these flanges being extended from one end of the sill to the other and serving as final assembly joint structures for securing the body side wall thereto. In their zones of merger at 17 and 18, Fig. 2, the channels 13 and 14 telescope each other for a substantial portion of their length and are strongly secured together by spot welding through the overlapping side and bottom walls of the channels. See also Fig. 9.

In view of the sharp upward bend of the sills in front of the rear axles the rear portions of both the outside and inside members 13 and 14 are made as separate stampings secured, as is clearly shown in Fig. 7, through the overlapped bottom walls of the channels by spot welding and the side walls of the channels being secured together along their margins by gas or arc welding as shown at 19.

The side sills 10 so formed are secured together by a number of cross braces numbered from front to rear, 20, 25, 32, 36 and 37, respectively.

At the extreme front end they are joined by an outwardly facing flanged channel cross member 20, the ends of which are secured through the bottom walls of the channel 20 to inward extensions 21, see Figs. 2, 3 and 4, from the bottom wall of the side sill channels. The top and bottom flanges 23 and 24 of this transverse member provide final assembly joints similar to the top and bottom flanges 15 and 16 of the side sills for the securement of the front end wall of the body superstructure.

Figure 6:
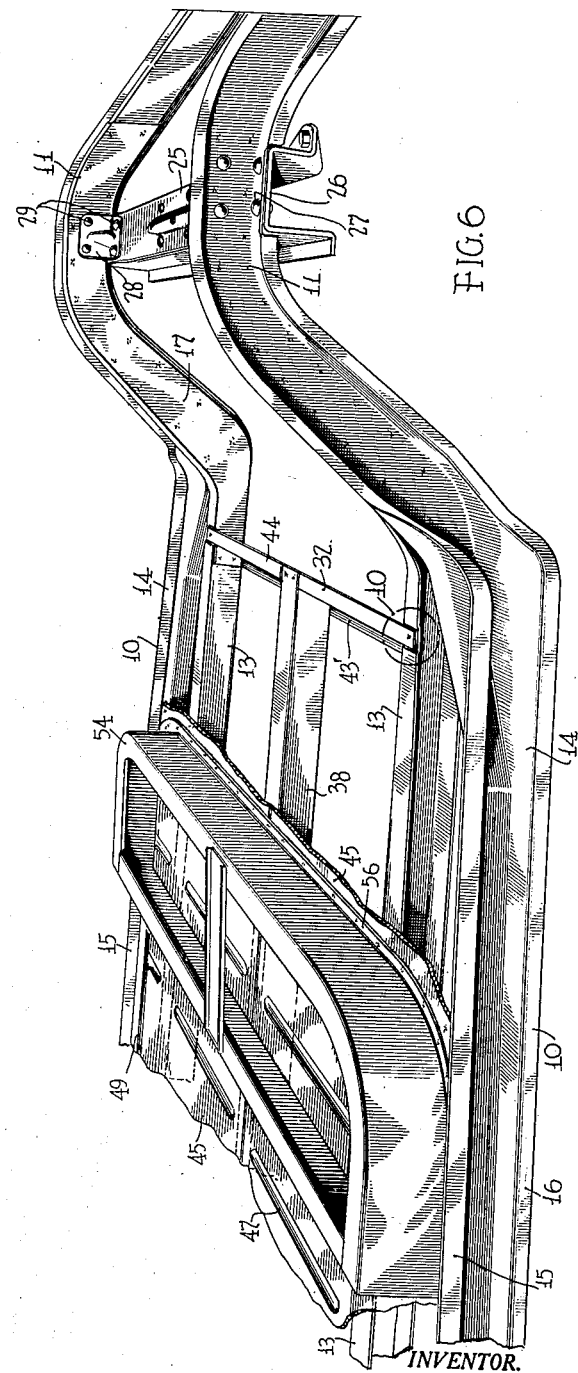
Fig. 6 is an enlarged fragmentary perspective view of the front portion of the underframe, the front part of the flooring being broken away, the view being taken looking down upon the underframe.

In the bight of the upwardly offset front portions 11 of the sills they are interconnected by a downwardly open channel section cross member 25 of somewhat heavier gauge than the sills having its bottom wall 26, see Fig. 9 in overlapping engagement with the bottom walls of the channels of the side sills and secured thereto by rivets as indicated at 27. Additionally, the bottom wall of the channel cross member is interbraced to the bottom wall of the channel side sills through angle brackets 28 riveted at 29, see Figs. 6 and 9, to the respective members. This cross member 25 is adapted to mount the springs for the front wheel suspension and is reinforced in its central portion as seen in Figs. 4 and 9, by a shallow downwardly opening channel reinforce 30 extending between its side walls and spot welded thereto. A number of tubular spacers 31 extend between this reinforcing channel 30 and the bottom wall of the channel 25 which is shown offset upwardly to a slight extent at its central portion. As shown in the plan view of Fig. 3 a number of bolt openings are provided in the channel 25, these openings extending through the tubular members 31 and through the reinforcing channel 30 and being adapted to receive the bolts to secure the front spring suspension.

Just rearwardly of the front kick-up portion of the side sills the inner members 13 of said sills are interconnected by a transverse cross brace 32, see Figs. 3, 4, 6 and 10, of substantially Z-section, the ends of which are connected as by welding to the top and bottom side walls of the channels 13 by lateral extensions 34 and 35 of the top and bottom arms of the Z respectively. The top wall of the channel 13, as clearly appears in Fig. 10, is offset downwardly in this region, as shown at 33, a distance equal to the thickness of the metal of the extension 34 of the cross member 32 to receive this extension flush with the top face of the sill.

In the angle formed by the rear kick-up portions of the sills the outer and inner sill members 13 and 14 are interconnected and connected to the sill members on the opposite side of the underframe by an angle section transverse member 36, best seen in the enlarged view of Fig. 5. This member overlaps the side walls of the sill members on opposite sides of the angular bend formed in the bottom of the sills in this region and is secured, as by spot welding, to the sills throughout this overlapped region.

At the extreme rear end the sills are connected by the member 37 of substantially Z-section, one arms of the Z overlapping the rearward channel side wall of the sills and being secured thereto and the other arm extending downwardly at 38 and forms a final assembly joint for the lower edge of the rear portion of the body. Between the cross members 36 and 37 the side sills are very sharply upwardly bowed and extended substantially parallel to the wheel plane when viewed in plan, with the exception of their extreme rear ends which are slightly offset inwardly.

In the space between the side sills and the cross members 36 and 37 it is intended to arrange the motor and transmission directly over the rear axle. These parts are so arranged as to additionally interbrace the side sills in this region, the chassis of my invention being particularly adapted for a construction in which a rear mounted motor is employed.

Between the cross members 32 and 36 and centrally thereof, is extended the longitudinal member 38. As clearly shown in Figs. 7 and 8, this member may be of downwardly presenting channel cross section having its side walls flanged inwardly at 39 but spaced apart in their edges a substantial distance as appears from the showing in Fig. 8. At the rear, this member rests on top of the lower arm 40 of the cross member 36, see Fig. 7, and has its end abutting the vertically extending wall 41. It is secured to the lower wall 40 by angle brackets 42 overlapping the respective parts and to the vertically extending wall 41 by extensions 43 from the side and bottom walls. At the front it is similarly secured to the member 32 and rests upon the rearwardly extending arm 43′ at the bottom of the member 32 its top wall being substantially flush with the top forwardly extending arm 44 of the member 32 and spot welded thereto.

The framework so formed is additionally strongly interbraced by a floor plate as 45 extending from side to side of the outermost portions 14 of the sills and from the front cross member 32 to the rear cross member 36. For convenience of assembly this floor plate may be made in two halves divided at the center along the line 46. The plate is stiffened by shallow transverse ribs 47 and longitudinal ribs 49 adjacent its lateral margins. This plate overlaps all five of the longitudinally extending members 13, 14 and 38 and is rigidly secured thereto by spot welding as clearly appears from Fig. 8. At its front end it is flanged downwardly and as shown in Fig. 4 at the point 50 just rearwardly of the vertically extending portion of the transverse member 32.

From this region it is preferably extended forwardly by a separate forward extension 51 having a flange formed in its rear margin overlapping the flange 50 and secured thereto and to the vertical extending portion of the cross member by spot welding. This forward extension 51 extends upwardly over the upwardly inclined portions of the side sills and is secured thereto in this region to reinforce the same and to form a foot board.

At the rear floor plate 45 is extended beyond the horizontal portion of the sills some distance upwardly as shown at 52, Fig. 5, over the inclined rear portions of the sills and secured to these portions to interbrace the same, this upward extension forming, with the member 36 and a member 53 interconnecting the rear edge of the floor plate and the upper margin of the angular member 36, as clearly appears in Fig. 5, a substantially box section transverse bracing structure between the sills in this region. As shown in Fig. 5, the member 53 is formed with edge flanges which overlap and are spot welded to the floor plate extension 52 and to the flanged margin of the vertically extending arm 40 of the angle cross brace 36, and at its ends it is formed with lateral flange, as 53', spot welded to the bottom walls of the inner channel sill members 13.

This floor board reinforce extended not only through the downwardly offset central portion of the chassis of the underframe, but also through the upwardly extended end portions thereof forms a strong reinforcement for the underframe in these regions as well as providing the body flooring.

To additionally interbrace the underframe in transverse direction the seat risers 54 and 55 are utilized. The front seat riser 54 comprises a substantially box section structure open at the bottom, its side walls being laterally flanged by a flange 56 extending substantially completely around the structure. This box section structure is set down upon the floor plate and spans the underframe from side to side, and as clearly appears in Fig. 8, is secured through this outwardly extended flange 56 with the side sills and flooring to form a substantially box section transverse brace extending from side to side of the chassis underframe. Similarly the rear seat riser 55 is flanged outwardly at the bottom at 57 and secured to the floor plate and the side sills through this outwardly extended flange. At the rear it is formed with an upwardly extending flange 58 overlapping the upwardly extending portion 52 of the floor plate and is secured thereto and to the sills by spot welding to form a second box section reinforce in the region of the "kick-up" portion of the sills.

Finally, to still further reinforce the downwardly offset intermediate portion of the underframe, I may provide a light gauge under side plate 75, see Figs. 4 and 8. This plate is preferably formed in two halves, one on each side of the longitudinal center of the chassis and each extending from a central vertically extending flange 76 extending into the central downwardly facing channel 38 of the frame laterally to overlap the bottom side walls of the sill members 13 and 14, and longitudinally from the member 32 to the member 36. These plates may be secured in place by first spot welding them to the central member 38 through the inwardly extending flanges 39 on its side walls and then spot welding them to the bottom side walls of the members 13 and finally spot welding the outer margins to the outer side walls of the members 14. These plates 75 may be made very thin so that they can be bent away in their outer margins to permit the insertion of welding tongs between their outer margins and the sill member 14 in order to weld them to the bottom side walls of the members 13. While these lower plates are primarily to close up and form a smooth lower surface for the intermediate low hung portion of the underframe, they yet contribute quite substantially to the strength of the entire structure, forming with the top plating and the spacing frame members a double walled floor structure in the region between the axles.

The underframe according to the foregoing description provides a very strong and rigid yet extremely light construction and one which is readily adapted to have the body side walls come down over its outside faces and be secured thereto to additionally reinforce the same by forming therewith additional box section structures.

For example, as shown in Fig. 8, the body side walls in the region below the thresholds may be formed of outer and inner stampings 59 and 60 which are flanged in their edges and secured together through their edge flanges and in the final assembly to the edge flanges 15 and 16 of the chassis side sills to form therewith a double box section structure along the lower margins of the combined body and chassis structure.

In the regions of the front wheel housing, as shown in Fig. 9, the wheel housing 61 forming the lower side edge of the body in this region is brought down to overlap the upwardly and downwardly extending flanges 15 and 16 of the chassis and secured thereto by spot welding to form a box section in this region.

Across the front of the chassis, see Fig. 12, the lower edge of the body paneling 62 is formed to overlap the flanges 23 and 24 of the front cross member and form therewith a box cross section structure. In its region of connection to the top flange 23 the body panel may be offset rearwardly to form a rabbet 63 to receive the edge of a hinged cover 64 providing access to a compartment in the body forwardly of the dash and adapted to form the spare tire and luggage compartment. The bottom of this compartment is indicated in Fig. 1 by the double dotted line 65 to which the flanged forward end 66 of the upwardly extended floor plate portion 51 may be secured, as indicated in Fig. 1.

In the region of the rear wheel housing, see Fig. 11, the wheel housing portion of the body 67 fits over the outwardly opening channel section of the sill and is joined thereto in a manner similar to the joinder of the front wheel housing by welding the wheel housing panel 67 to the top and bottom flanges 15 and 16 of the sills 10. The outer portion of the wheel housing stamping 67 of the body is shown in Fig. 11 as being flanged upwardly at 68 and receiving in overlapping engagement therewith a flange 69 at the lower edge of the body panel, the body of which panel forms a continuous S-bend curvature with the fender 70 having a marginal downwardly extending flange 71. The flanges 68, 69 and 71 are all adapted to be secured together by a common set of bolts 72, the usual weather strip being provided between the body panel and fender. The relation of the wheel to the wheel housing and fender is indicated in dot and dash lines.

At the rear, see Fig. 5, the rear wall of the body is shown formed by a curved panel 73 which is flanged in its margin at 74 and secured through said flange to the downwardly extending flange 38 of the rear cross member 37 in the final assembly of the body with the underframe of this invention.

The underframe according to this invention has the advantage not only of extreme lightness of construction combined with adequate strength and ease of assembly by simple spot welding operations, but also is well adapted to receive and secure the body thereto in the final assembly, similarly by lines of spot welds. As above pointed out, the body may readily be brought down over and secured to the margins of the underframe to form in the side and front regions particularly box section combined body and chassis structures adding additional reinforcement to the lower margins of the underframe structure.

While I have hereinbefore described a specific form which the invention may take and which I have found very practical, it will be understood that such changes and modifications as may be made by those skilled in the art which yet fall within the broad spirit and scope of the invention are intended to be covered as well in the appended claims.

What I claim is:

1. A combined body and chassis underframe comprising side sills arranged in the region between the wheel axles substantially at the level of said axles, said sills comprising inner straight portions and outer substantially curved portions conforming to the contour of the lower side edges of the body and a flooring sheet extending from side to side over said sills and secured thereto, cross braces connecting the sills and including a seat riser seated on top of said flooring sheet and sills and secured thereto.

2. A combined body and chassis underframe comprising opposite pairs of side sills of laterally facing channel form in the region between the wheel axles, the outer sills conforming to the sides of the lower edges of the body and the inner extending substantially straight, and a floor sheet extending across said sills and secured to their top walls, the central portion of said floor sheet being reinforced by a longitudinal member of channel section, said central member being supported at its ends by transverse members extending between the sills.

3. A vehicle underframe having side sills extending between the wheel axles, said sills being of double form between the axles including inner and outer portions, both said inner and outer portions being laterally facing channels, the ends of which are interconnected by the overlapping side walls of the channels, and a floor plate superimposed and connected to the top walls of said sills, the inner portions of said sills being substantially rectilinear and the outer portions bowed to conform to the contour of the lower edge of the body.

4. In a combined body and chassis underframe, a side sill having its forward and rearward portions, when viewed in plan, extending substantially parallel to the plane of the wheels, and its intermediate portion formed by a substantially rectilinear member connecting said forward and rearward portions, and an outwardly bowed member conforming to the shape of the body and constructed and arranged to receive the lower edge of the body thereagainst and form therewith box section side sill structures in final assembly, said members being joined by a lap joint in the forward and rearward portions of the sill.

5. A combined body and chassis underframe comprising spaced longitudinal members arranged at center and sides, cross members connecting said longitudinal members adjacent the front and rear axles, and top and bottom plating interconnecting said longitudinal and cross members.

6. A low hung combined body and chassis frame having the floor arranged substantially in the plane of the axles in the region between the axles, said frame in said region being built up of spaced pairs of side sills interconnected in regions adjacent the axles by cross members, a floor plate extending from side sill to side sill and from cross member to cross member and joined to said sills and members, and transverse front and rear seat risers flanged in their bottom edges and secured to said floor plate and side sills to provide additional stiffening for the chassis frame.

7. A combined body and chassis frame comprising side sill members extending generally parallel to the wheels at front and rear when viewed in plan, and bowed outwardly between the wheels to substantially the contour of the lower side edges of the body and adapted to receive the same directly thereagainst, and inwardly located substantially rectilinear sill members connecting said end portions of the first named sill members, and a floor sheet extending across and interconnecting all said sill members.

8. A combined body and chassis frame comprising pairs of side sill members on opposite sides of the frame spaced in their intermediate portions for only a relatively small fraction of the entire width of the frame, but merged into a single sill member at their end portions, the outer member of said spaced portions conforming in contour to the lower edge of the body, a floor sheet extending across and interconnecting the tops of all said sill members, and a bottom sheet connecting the bottoms of said members.

9. A low hung combined body and chassis frame, comprising side sills of downwardly open U-form over the front and rear axles and intermediate said axles arranged at substantially the level of the axles, a spring suspension cross brace extending between the bight of the U's over the front axle, and a cross brace connecting the sills just forwardly of the rear axles, the space rearwardly of said latter cross brace and between the sills being adapted to receive the motor and transmission.

10. A low hung combined body and chassis frame comprising side sills having a portion between the axles extending horizontally substantially at the level of the axles and upwardly extended front and rear portions extending over the axles, a floor plate connecting the sills in their intermediate low level portion and extended at the front to connect the upwardly extending front portions of the sills and form a foot-board.

11. A low hung combined body and chassis frame, comprising side sills having portions between the axles extending horizontally substantially at the level of the axles and upwardly extended front and rear portions extending over the axles, a floor plate connecting the sills in their horizontally extending portions and extended over a portion of said upwardly extended front and rear portions and interconnecting the sills also in last-named said portions, the forward extensions forming also the toe-board.

12. A combined body and chassis frame comprising side sills having intermediate horizontally extending portions and rear "kick-up" portions extending over the rear axle and cross connections between the sills at the region where the horizontal portions merge with the "kick-up" portions, including a floor plate connecting the tops of the sills, and an angular member interconnecting the bottoms of the sills, both said floor plate and angular member extending through horizontal and kick-up portions of the sills.

13. A combined body and chassis frame comprising side sills having intermediate horizontally extending portions and rear kick-up portions extending over the rear axle, including a floor plate connecting the tops of the sills, an angular member interconnecting the bottoms of the sills, and a member interconnecting the floor plate and angular member and forming therewith a substantially box section structure.

14. A combined body and chassis frame comprising side sills having intermediate horizontally extending portions and rear "kick-up" portions, a floor plate interconnecting the tops of the sills in their horizontally extending portions and extending up over at least a portion of the "kick-up" portions and interconnecting the sills in that region, a seat riser connected to said floor plate and sills and forming with the floor plate a substantially box section structure.

15. A combined body and chassis frame comprising side sills having intermediate substantially horizontally extending portions and rear "kick-up" portions extending over the rear axle, and a cross connection including flooring and a seat riser extending between the sills in the region of the merger of the horizontal portions with the "kick-up" portions, said cross connection forming a substantially double box section structure.

16. A combined body and chassis frame comprising side sills, a floor plate transversely interconnecting the tops of the side sills, and a seat riser having continuous side walls forming a closed box in horizontal section and interconnecting the sills and floor plate and forming a hollow section structure therewith.

17. A combined body and chassis underframe having side sills forming main load supporting elements and extending up to the end of the said underframe, and an end sill interconnecting the side sills, said sills conforming in contour to the lower edge of the body superstructure, each of said sills being in the form of an outwardly facing channel having laterally flanged side walls, the lateral flanges on the side walls of said channels forming continuous final assembly joint structures extending substantially continuously along the sides and across one end and adapted to receive the side walls and one end wall of the body in overlapping and secured relation therewith whereby to form therewith in the final assembly a box-section structure extending around at least three sides of the underframe.

18. A vehicle underframe having side sills extending between the wheel axles, said sills being of double form between the axles including inner and outer portions, both said inner and outer portions being laterally facing members of hollow section, the ends of which are interconnected by the overlapping walls of said hollow section members, and a floor plate superimposed and connected to the top walls of said sills, the inner portions of the sills being substantially rectilinear and the outer portions bowed to conform to the contour of the lower edge of the body.

19. A combined body and chassis frame comprising pairs of side sill members on opposite sides of the frame spaced in their intermediate portions for only a relatively small fraction of the entire width of the frame, but each merged into a single sill member at at least one of the end portions thereof, the outer member of said spaced portions conforming in contour to the lower edge of the body, and a floor sheet extending across and interconnecting the tops of all said sill members.

20. A vehicle underframe having sills extending longitudinally on both sides of the vehicle between the wheel axles, each of said sills comprising members laterally spaced from each other for only a relatively small fraction of the entire width of the car in their intermediate portions, which members merge and are secured together in the regions adjacent the axles and extended over the axles through upwardly offset portions, and a floor plate overlying said sills between the axles and interconnecting them, and a seat riser also interconnecting said floor plate and sills.

21. In a combined body and chassis construction, a sill comprising a pair of laterally outwardly facing channel members spaced in their intermediate portions for only a relatively small fraction of the entire width of the vehicle, the outer one conforming in contour to the lower side edge of the body and formed with laterally flanged side walls, but merged at their ends to form a single sill portion at the ends also having side walls, the channels of the members being telescoped within each other in the zone of merger and rigidly joined together, and a body side wall panel arranged in final assembly to overlap said sill from substantially end to end and be secured thereto through the flanged side walls to form a box section structure.

JOS. LEDWINKA.